United States Patent [19]

Kadokura

[11] Patent Number: 5,359,805
[45] Date of Patent: Nov. 1, 1994

[54] RAT GUARD METHOD

[75] Inventor: Iwao Kadokura, Saitama, Japan

[73] Assignee: Kabushiki Kaisha Okanishi, Tokyo, Japan

[21] Appl. No.: 103,703

[22] Filed: Aug. 10, 1993

[30] Foreign Application Priority Data

Nov. 17, 1992 [JP] Japan ................... 4-329918

[51] Int. Cl.⁵ .............................................. A01M 29/00
[52] U.S. Cl. .......................................... 43/124; 43/108
[58] Field of Search ................................... 43/108, 124

[56] References Cited

U.S. PATENT DOCUMENTS 35,471  6/1862  Record ................................ 43/108

FOREIGN PATENT DOCUMENTS 6095786  2/1987  Australia .
2251261  6/1975  France ................................ 43/124
112455  3/1989  Japan .

*Primary Examiner*—Kurt C. Rowan
*Attorney, Agent, or Firm*—Stevens, Davis, Miller & Mosher

[57] ABSTRACT

A rat guard method consists of covering an article to be protected with a sheet made of a flexible material such as a synthetic resin sheet, and covering the sheet with a freely bendable net which is formed by connecting links made of a rigid material such as aluminum freely movably to one another in a two-dimensional pattern, so that the article to be protected can be easily protected from harm by rats.

6 Claims, 5 Drawing Sheets

RAT GUARD METHOD

BACKGROUND OF THE INVENTION

This invention relates to a rat guard method for protecting farm implements and harvested farm produce from harm by rats.

As a method to protect farm implements such as rice reapers and threshers and harvested farm produce kept in storage from harm by rats, a rat guard net disclosed in Japanese Patent. Publication No. 12455/1989 and Australian Patent No. 596111 is known. That guard net is formed by having links of a rigid material such as metals which cannot be gnawed by rats fitted to form meshes fine enough to prevent rats from passing through and to be freely bendable. It is used to cut off a passage by rats and used as a drape over an article to be protected.

Though the aforementioned rat guard net can be used without any problem to cover a protected article having no projections on its surface such as bagged farm produce, when it is used to cover boxes or farm implements, its links are caught by the corners of boxes or the projected parts of farm implements, making it very troublesome to cover such protected articles or to remove the net from them. This may sometimes result in the breakage of the net or the protected articles.

SUMMARY OF THE INVENTION

In view of the above problems, this invention is to provide a rat guard method to easily protect an article to be protected from the harm by rats without fear of damaging the article to be protected.

The first embodiment of this invention is a rat guard method which is characterized by covering a protected article with a sheet made of a flexible material and further covering the above sheet with a net which is formed by mutually connecting links of a rigid material freely movably in a two-dimensional pattern.

The second embodiment of this invention is a rat guard method which is characterized by hanging the above net from the entire circumference of a top board held by supports to reach a floor and accommodating protected articles into the space surrounded by the net.

The third embodiment of this invention is a rat guard method which is characterized by suspending the aforementioned net from above and accommodating protected articles into the space surrounded by the net.

In the above second and third embodiments of this invention, the sheet of a flexible material may be disposed inside the net to form the same double construction as in the first embodiment.

DETAILED DESCRIPTION OF THE INVENTION

Figure 1:
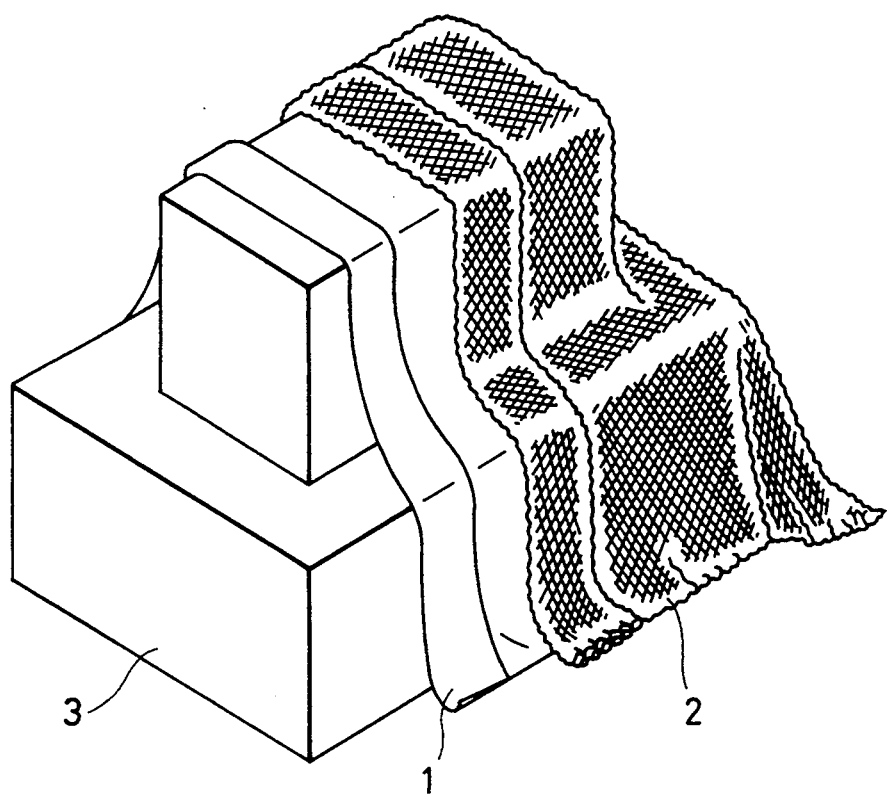
FIG. 1 is a perspective view showing one-embodiment of this invention.

FIG. 1 shows one embodiment of the first rat, guard method of this invention. In the drawing, reference numeral 1 stands for a sheet made of a flexible material, 2 for a net made of a rigid material, and 3 for an article to be protected.

In this method, the protected article 3 is first covered with the sheet of a flexible material. The covering method is not specially limited, and a spread sheet may be glidingly pulled from one end of a protected article to cover it, or a folded sheet may be spread on a protected article to covet it. In any event, it is necessary to thoroughly cover the corners and projected parts of the protected article to obtain satisfactory effects of this invention.

In this method, since the corners and projected parts of the protected article 3 are covered with the sheet 1 which is used prior to the net 2, the links of the net 2 are not caught by the protected article 3. Therefore, the net 2 can be glidingly moved smoothly on the sheet 1 and the covering or removing work of the net 2 can be done swiftly.

A material for the above sheet in this method may be any kinds if it has appropriate thickness and strength to provide the aforementioned effects, namely, covering the corners and projected parts of the protected article and preventing the net used on the sheet from being caught by the corners or projected parts. For example, it may be a flexible material such as a flexible plastic sheet, fabric made of synthetic or natural fiber, non-woven fabric, paper or laminated product, thereof. A fabric made of natural fiber whose back face is coated with rubber for waterproofing, for example, can protect a protected article from wind and rain when used outdoors, or can prevent a protected article from getting dry if it has to be kept free from dryness. Besides, if the sheet is made of a thin expanded resin, it can resist an external impact to prevent a protected article from being damaged.

Then, this method further covers the sheet 1 covering the protected article 3 with the net 2, This covering method is not particularly limited as in the case of covering the sheet, and the net 2 may be glidingly pulled from one end of the protected article which has been covered with the sheet 1 to cover it. For example, the net 2 which has been rolled from both ends toward its center is placed at the center on the protected article 3 covered with the sheet 1 and is unrolled to drape over the both sides of the protected article 3, so thai the center of the net 2 can be easily aligned.

The net 2 is a net formed by connecting links made of a rigid material, which cannot be gnawed by rats, freely movably to one another in a two-dimensional pattern, and the meshes of the net 2 are so small that rats cannot pass through. Consequently, rats cannot get into the sheet to damage the protected article or gnaw the sheet or the protected article from the outside.

Figure 2:
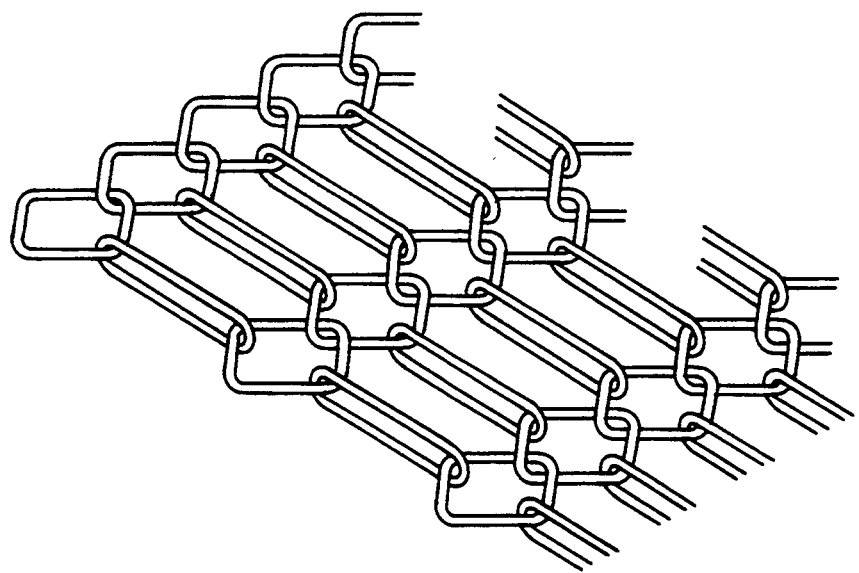
FIGS. 2 through FIG. 4 are enlarged partial views of the nets used in this invention.
Figure 3:
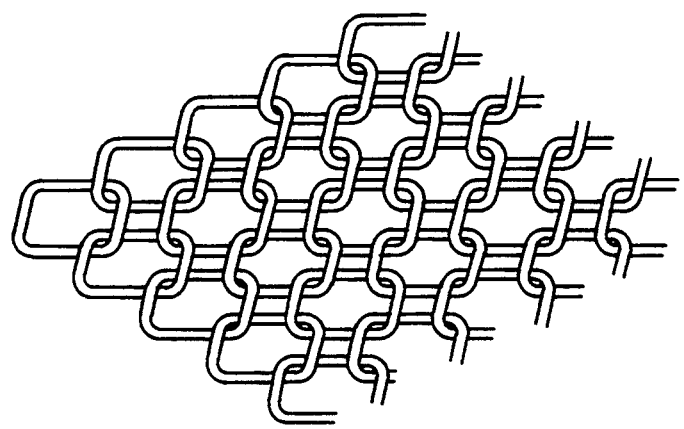
Figure 4:
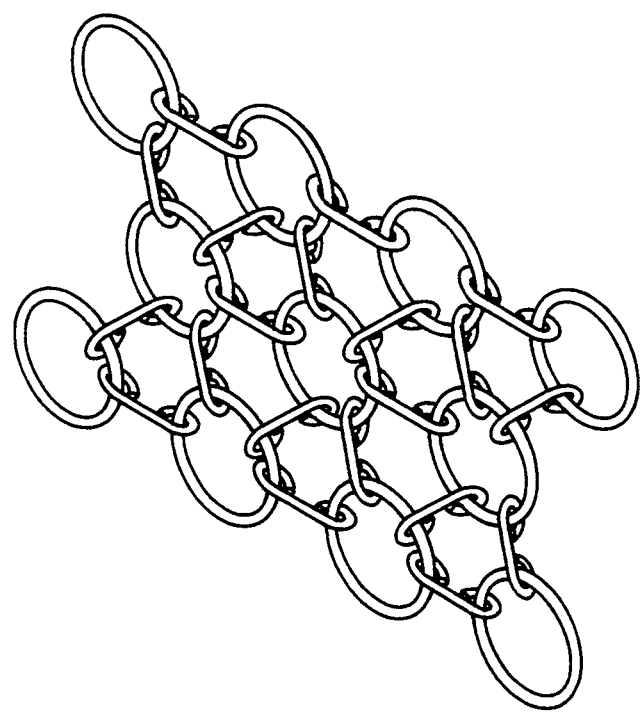

FIG. 2 through FIG. 4 show specific examples of the nets used in this method. As shown in FIG. 2 through FIG. 4, circular, rectangular or elliptic links and connectors are combined, so that they can be fitted freely movably in one another. Particularly, a net formed by connecting circular links each arranged at the apexes of a triangle with longitudinal connectors as shown in FIG. 4 can minimize the sizes of the openings of the links and those formed by the links while retaining a high free movability of the links and prevent rats from invading. Thus, it can be used preferably.

A material for the net of this invention is not specially limited if it is rigid enough to resist the damage by rats and includes a rigid synthetic resin, metal or composite thereof. In this method, an aluminum alloy or the like is preferably used since it is easily molded.

In this method, weights can be placed on the skirt of the net or on the margin of the net remained in excess after covering a protected article, so that the sheet is prevented from being blown off by a wind. Besides, using a heavy material such as metal fox the net can prevent the sheet from being blown off by a wind as the net itself holds the sheet down.

Furthermore, this method can partly fix the net to the sheet, so that the net and the sheet can be covered on or removed from a protected article together.

Figure 5:
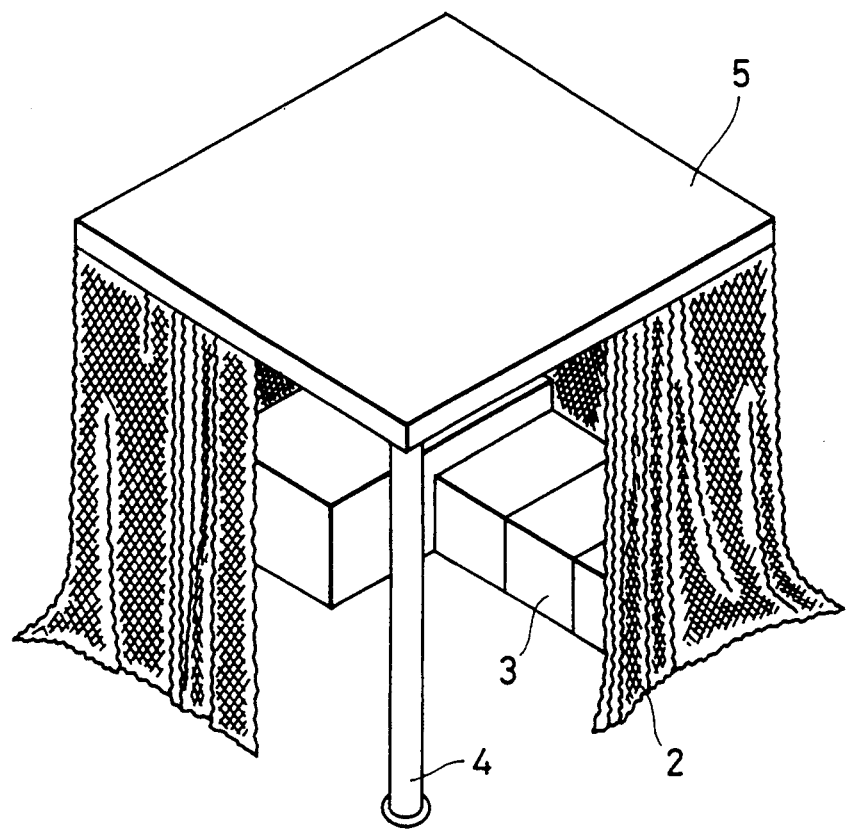
FIGS. 5 and FIG. 6 are perspective views showing other embodiments of the rat guard method of this invention.

FIG. 5 shows one embodiment of the second rat guard method of this invention. In the drawing, reference numeral 4 stands for a support and 5 for a top board.

This method supports the top board 5 with four supports 4 and hangs the net from the entire circumference of the top board, so that protected articles can be protected with the net without having the net caught by the corners or projected parts of the protected articles. Specifically, the net 2 is attached like a curtain to the top board 5 as shown in FIG. 5, and the net 2 is partly drawn to open, so that the protected articles can be easily carried in. In addition to the hanging of the net 2 like a curtain as shown in FIG. 5, this method can hang respective net 2 from each side of the top board 5 and roll it up to allow easy carrying in or out of the protected articles. In this method, it is required not to form a gap between the net and the floor, the net and the net, and the top board and the net to prevent rats from entering through such a gap.

The net used in this method is the same with the one used in the first method of this invention. And the top board may be any material if it can prevent rats from entering. A wooden, light-weight plastic or metallic board is suitably used.

The third method of this invention will now be described. A net to be used in this method is the same as used in the first method of this invention. This method hangs the net from, for example, the ceiling or the tops of columns erected to form a space surrounded by the net.

Figure 6:
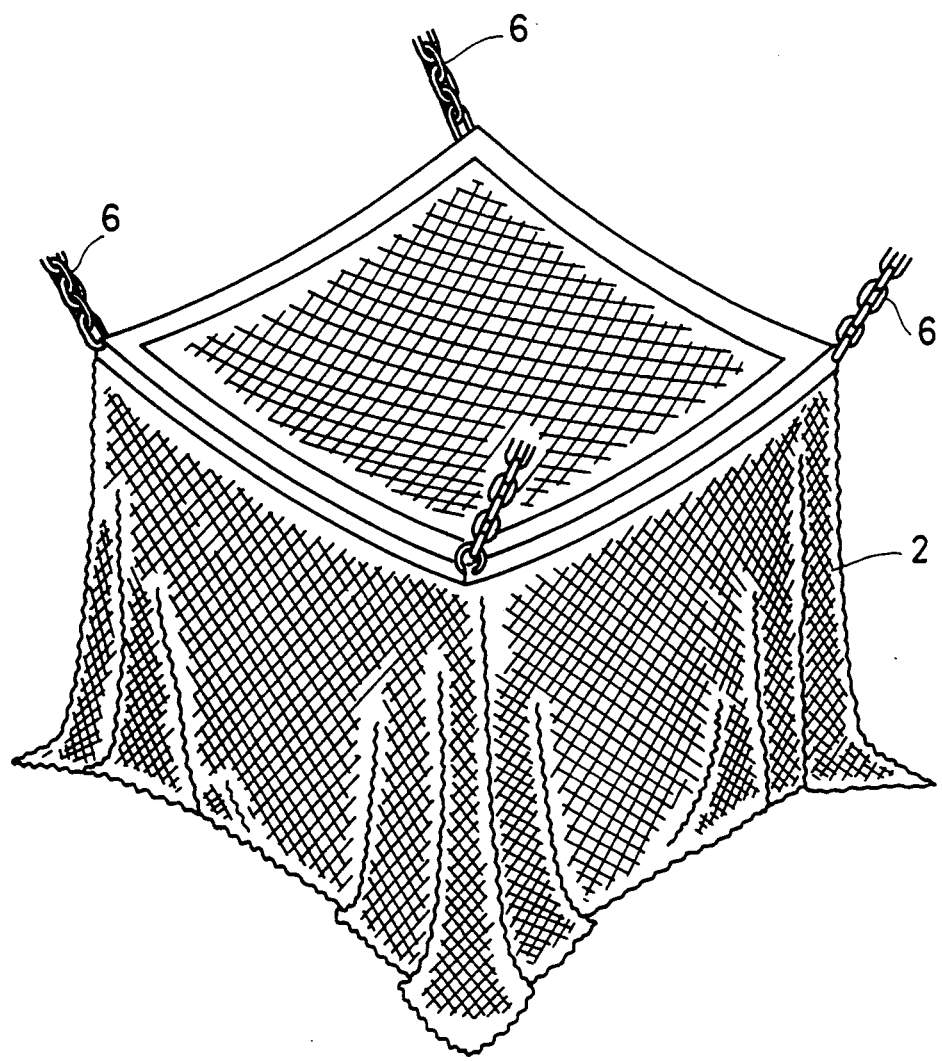

FIG. 6 illustrates one embodiment of the above method. In the drawing, reference numeral 6 stands for fittings to suspend the net. In this embodiment, the top is also formed by the net but it may be made of another material as shown in the method of FIG. 5. In addition to the method of suspending the net 2 from four sides as shown in FIG. 6, a frame of metal or the like may be hung with the net attached to it. In this method, the net 2 can be partly rolled up or opened, so that the protected articles can be easily carried in the same manner as in FIG. 5. Furthermore, the fittings 6 can be pulled up to raise the not as a whole so as to make the carrying in or out of the protected articles much easier.

In this method, it is also required not to form a gap between the net, and the floor.

In the second and third methods of this invention, when the sheet of a flexible material used in the first method is employed inside the net, the protected articles can be protected against wind and rain, dryness or irradiation of light when used outdoors.

As described above, the rat guard method of this invention has very high work effectiveness and thoroughly protects the protected articles and the net, from being damaged as compared with a conventional method using a net alone. And, it is economical and can be used outdoors without being affected by contamination or wind and rain.

What is claimed is:

1. A rat guard method which comprises covering an article to be protected with a sheet of a flexible material and further covering the sheet with a net which is formed by connecting links of a rigid material freely movably to one another in a two-dimensional pattern.

2. A rat guard method according to claim 1, wherein said sheet is selected from the group consisting of flexible plastic sheet material, fabric made of synthetic or natural fiber, nonwoven fabric, paper and a laminated product thereof.

3. A rat guard method according to claim 1, wherein said sheet is a fabric made of natural fiber having a back face coated with rubber.

4. A rat guard method according to claim 1, wherein said net is made of a material selected from the group consisting of rigid synthetic resin, metal or composite thereof.

5. A rat guard method which comprises hanging a net, which is formed by connecting links of a rigid material freely movably to one another in a two-dimensional pattern, from the entire circumference of a top board held by supports to reach a floor and accommodating an article to be protected into the space surrounded by the net; including disposing a sheet made of flexible material inside the net.

6. A rat guard method which comprises hanging a net, which is formed by connecting links of a rigid material freely movably to one another in a two-dimensional pattern, from a ceiling or a top of a column and accommodating an article to be protected into the space surrounded by the net; including disposing a sheet made of flexible material inside the net.

* * * * *